United States Patent [19]

Miyazaki et al.

[11] Patent Number: 4,845,021

[45] Date of Patent: Jul. 4, 1989

[54] METHOD FOR RECORDING OPTICAL INFORMATION IN OPTICAL HIGH DENSITY RECORDING MEDIUMS

[75] Inventors: Jinsei Miyazaki; Eiji Ando, both of Osaka; Kimiaki Yoshino, Kyoto; Kazuhisa Morimoto, Osaka, all of Japan

[73] Assignee: Matsushita Electric Industrial Co., Ltd., Japan

[21] Appl. No.: 145,686

[22] Filed: Jan. 14, 1988

Related U.S. Application Data

[62] Division of Ser. No. 836,625, Mar. 5, 1986.

[30] Foreign Application Priority Data

| Mar. 6, 1985 [JP] | Japan | 60-44061 |
| Mar. 8, 1985 [JP] | Japan | 60-47197 |
| Oct. 17, 1985 [JP] | Japan | 60-231517 |
| Oct. 17, 1985 [JP] | Japan | 60-231518 |
| Oct. 17, 1985 [JP] | Japan | 60-231519 |

[51] Int. Cl.[4] .................................................. G03C 1/00
[52] U.S. Cl. .................................... 430/495; 430/333; 430/330; 430/335; 430/345; 430/945; 430/962
[58] Field of Search ............... 430/333, 335, 330, 345, 430/495, 945, 962

[56] References Cited

U.S. PATENT DOCUMENTS

| 3,810,762 | 5/1974 | Wilrisk et al. | 430/345 |
| 3,810,763 | 5/1974 | Wilrisk et al. | 430/345 |
| 3,980,480 | 9/1976 | Laridon et al. | |
| 3,989,530 | 11/1976 | Robillard | |
| 4,030,926 | 6/1977 | Stahlke et al. | |
| 4,270,130 | 5/1981 | Houle et al. | |
| 4,412,231 | 10/1983 | Namba et al. | |
| 4,513,071 | 4/1985 | Mey | |
| 4,737,427 | 4/1988 | Miyazaki et al. | 430/31 |

FOREIGN PATENT DOCUMENTS

| 59-223957 | 12/1984 | Japan. |
| 845939 | 8/1960 | United Kingdom. |
| 2173914 | 10/1986 | United Kingdom. |

OTHER PUBLICATIONS

Optical Eng., vol. 15, No. 2, Mar./Apr. 1976, Review and Analysis of Optical Recording Media, Bartolini et al., pp. 99–108.

Photocontraction of Liquid Spiropyran-Merocyanine Films, Science, vol. 226, 10-19-84, pp. 341-343.

Thin Solid Films, vol. 133, Nov. 1985, pp. 21-28, Elsevier Sequoia, Lausanne, CH; E. Ando et al.: "J-Aggregation of Photochromic Spiropyran in Langmuir-Blodgett films".

Primary Examiner—Ellis P. Robinson
Assistant Examiner—B. J. Ryan
Attorney, Agent, or Firm—Lowe, Price, Leblanc, Becker & Shur

[57] ABSTRACT

An optical recording medium which comprises a substrate and a recording layer of at least two J-aggregates of dyes formed on the substrate is described. The dyes may be photochromic dyes or other types of dyes capable of forming the aggregates which have narrower absorption spectral ranges than original dyes. A plurality of information bits can be written in the recording layer by irradiation of one laser beam spot. The recording layer is formed by an LB film method or a method capable of fluidizing a dye solution in a direction horizontal to the substrate surface. A recording method using the medium is also described.

6 Claims, 2 Drawing Sheets

METHOD FOR RECORDING OPTICAL INFORMATION IN OPTICAL HIGH DENSITY RECORDING MEDIUMS

This is a division of application Ser. No. 836,625 filed 3/5/86.

BACKGROUND OF THE INVENTION

1. Field of the Invention

This invention relates to optical high density recording mediums which comprise a recording layer of at least two organic dyes in which information is optically recorded or written and is subsequently read out from the recorded layer. The invention also relates to a method for making such mediums as mentioned above and to a method for recording optical information in the recording mediums.

2. Description of the Prior Art

The optical recording mediums of the above type may be broadly classified into two groups; one group being a rewritable medium and the other group being a write-once medium. A typical rewritable optical recording medium comprises an optically transparent disc substrate and a recording layer of a photochromic dye formed on the substrate. For information recording, while the optical recording medium is being rotated for tracking, a laser beam having a wavelength of $\lambda 1$ is spotted on one point of the disc surface. The photochromic dye on the spot undergoes the photochromic reaction and thus, the colorless dye on the spot is colored as having a visible absorption spectrum at $\lambda 2$. By this, single bit information is recorded on the spot. On reading, a weak laser beam having a wavelength of $\lambda 2$ is applied to the disc surface. The absorption of the beam in the colored portion can be detected from a change in intensity of transmitted light. On the other hand, when an intense laser beam having a wavelength of $\lambda 2$ is applied to the colored portion in the same manner as in the writing operation, the photochromic dye in the portion is turned colorless and thus the information can be erased.

If dyes having no photochromic properties are used as the recording layer, and the erasing operation is omitted from the above procedure for the photochromic dye medium, write-once optical recording is effected. However, in view of the principle of the known systems, only one bit is recorded by application of one spot of a laser beam. This places a limitation on the increase of a recording density.

SUMMARY OF THE INVENTION

It is therefore an object of the present invention to provide optical high density recording mediums in which a plurality of bits are written in the medium with one spot of a laser beam whereby the recording density can be increased.

It is another object of the invention to provide optical recording mediums in which optical information is three-dimensionally recorded in the medium on a portion where irradiation with a laser beam.

It is a further object of the invention to provide a method for making such an optical high density recording medium as mentioned above in which different types of dyes are used as one recording layer or separate recording layers and are thermally treated to give the respective aggregates with sharp half-value widths of absorption spectra.

It is a still further object of the invention to provide a method for recording optical information in such optical recording mediums as mentioned above.

The optical recording medium of the invention comprises an optically transparent substrate of a desired form and a recording layer formed on the substrate and comprising J-aggregates of at least two dyes having optically distinguishable absorption spectrum ranges and each capable of undergoing a color change on irradiation of a laser beam having a wavelength inherent to each J-aggregate. The at least two J-aggregates may be contained in one recording layer or may be separated as the respective sub-layers. The recording layer is preferably formed on the substrate by a method in which a solution or solutions of a plurality of dyes are coated onto the substrate while permitting the solution to be fluidized in a direction parallel to the substrate surface such as by spin coating. Alternatively, the recording layer may be formed by the Langmuir-Blodgett film method (hereinafter referred to simply as LB film method). The resultant recording layer is heated to a temperature sufficient to allow the respective dyes to form aggregates without causing the change of the molecular structure of the dyes. As a matter of course, the temperature depends on the type of dye. The formation of the J-aggregate is advantageous in that the aggregate has a narrower absorption spectrum range than the dye used, thus enabling one to make a recording layer or layers of higher sensitivity in response to laser beams having different wavelengths by using different types of dye aggregates. When light sources and photosensors are utilized corresponding to the respective aggregates having inherent absorption spectra, a plurality of bit signals can be written in one spot of laser beams having different wavelengths corresponding to the respective aggregates.

For recording of optical information, the optical recording medium having an optical transparent substrate and a layer of at least two dyes capable of forming corresponding aggregates is irradiated with an UV ray to form photomerocyanines of the at least two dyes, then heated to a temperature sufficient to cause the respective photomerocyanines to form aggregates, and subjecting the resultant medium to optical information recording.

DETAILED DESCRIPTION AND EMBODIMENTS OF THE INVENTION

Figure 1:
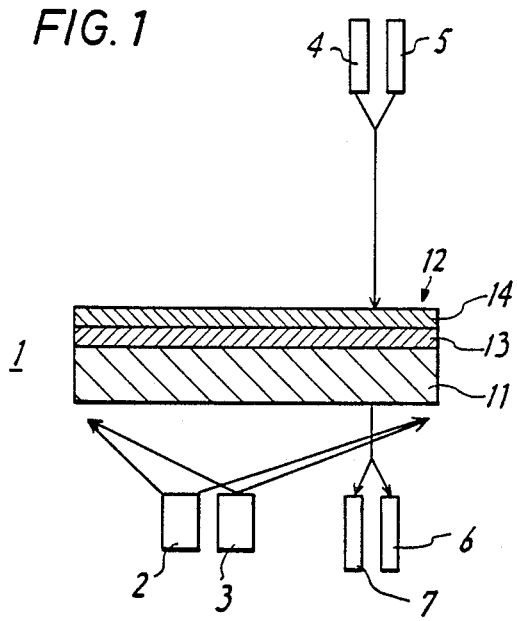
FIG. 1 is a schematic view, partially in section, illustrating a principle of a recording apparatus using an optical recording medium of the invention.

The recording layer or film of the invention comprises at least two types of organic dyes which are, respectively, converted into aggregates by association. As is well known in the art, organic dyes are able to form an aggregate of several dye molecules under certain conditions. In some cases, the aggregate has physical properties, such as stability, spectral characteristics and the like, completely different from an original dye. The aggregate used herein may include a dimer, a J-aggregate, an H-aggregate and composite materials thereof. In the practice of the invention, J-aggregates of dyes are favorably used. The term "J-aggregate" used herein is intended to mean an aggregate of a plurality of dye molecules without involving any change in chemical structure which has a sharper visible absorption spectrum range than the dye while the spectrum is shifted to a longer wavelength side. This property of the J-aggregate is utilized in the optical recording medium. A plurality of dyes having different absorption spectra within a narrow range can be optically distinguished and thus used for optical recording service.

The dyes capable of forming J-aggregates include photochromic dyes. Typical photochromic dyes include spiropyrans, azobenzenes, fulgides, indigoes, thioindigioes, triarylmethanes and the like. All these dyes do not form the aggregates but have the possibility of forming J-aggregates if properly substituted or under proper treating conditions. In the practice of the invention, photochromic dyes capable of forming J-aggregates are used, of which spiropyrans of the following general formula are preferred because of the good formation of J-aggregates

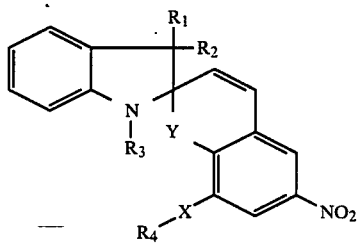

in which $R_1$ and $R_2$ independently represent an alkyl group having from 1 to 5 carbon atoms or an aromatic group, $R_3$ represents an alkyl group having at least 10 carbon atoms and preferably up to 30 carbon atoms, X is a single bond or a group selected from the following formulas —$C_nH_{2n}OCO$—, —$C_nH_{2n}COO$—, —$C_nH_{2n}NHCO$—, —$C_nH_{2n}CONH$—, and —$C_nH_{2n}O$—, wherein $n \geq 0$, $R_4$ represents an alkyl group having from 1 to 30 carbon atoms, and Y represents an oxygen or sulfur atom.

In the above formula, $R_1$ and $R_2$ are each preferably methyl, ethyl, propyl and the like, or phenyl. Likewise, $R_3$ is preferably decyl, undecyl or the like. X is preferably —$CH_2OCH$— or —O—.

Examples of typical spiropyrans include 6-nitro-1'-octadecyl-3',3'-dimethylspiro[2H-1-benzopyran-2,2'-indoline], 5-bromo-1'-octadecyl-3'-methyl-3'-phenyl-6-methoxyspiro[2H-1-benzopyran-2,2'-indoline], 6-hydroxy-1'-octadecyl-3,3'-dimethylspiro[2H-1-benzopyran-2,2'-indoline], 6-nitro-1'-octadecyl-8-docosanoyloxy-3',3'-dimethylspiro[2H-1-benzopyran-2,2'-indoline], 6-nitro-1'-octadecyl-8-docosanoyloxy-3',3'-dimethylspiro[2H-1-benzothiopyran-2,2'-indoline], and the like. Needless to say, these spiropyrans are used in combination of at least two compounds.

Spiropyrans are generally colorless but upon irradiation of UV rays, they are converted by photoisomerization into purple photomerocyanines having maximal absorption peaks at approximately 400 to 700 nm. In turn, when visible light is irradiated on the photomerocyanine, it is reversibly converted into a corresponding spiropyran. However, photomerocyanines are unstable in nature and are naturally faded in color even in the dark, thereby forming original spiropyrans. We have found that when spiropyrans which are able to form J-aggregates are formed as a layer and subjected to UV irradiation to form corresponding photomerocyanines, the photomerocyanines can be converted into more stable J-aggregates by thermal reaction. In addition, the J-aggregate is found to have a significantly narrower absorption spectrum range than an original dye. The spiropyrans defined by the general formula may be used in combination by proper selection in consideration of absorption spectra. Typical and, in fact, preferable combinations of spiropyrans include combination of 6-nitro-1'-octadecyl-8-docosanoyloxy-3',3'-dimethylspiro[2H-1-benzopyran-2,2'-indoline] capable of conversion to a corresponding aggregate predominantly absorbing light of 618 nm, 6-hydroxy-1'-octadecyl-3',3'-dimethylspiro[2H-1-benzopyran-2,2'-indoline] capable of conversion to an aggregate predominantly absorbing light of 520 nm, and/or 6-nitro-1'-octadecyl-8-docosanoyloxy-3',3'-dimethylspiro[2H-1-benzothiopyran-2,2'-indoline] capable of conversion to an aggregate predominantly absorbing light of 653 nm. It should be noted that dyes which are used in combination should preferably have absorption peaks, which are separate from each other at least by a wavelength value corresponding to the half-value width (whichever larger) or at least about 20 to 30 nm, when converted into corresponding aggregates.

The dyes useful in the practice of the invention are formed as a recording layer or layers by a variety of methods. Such methods include, for example, an LB film method, or methods in which a solvent used is fluidized in a direction horizontal to the surface of a substrate, e.g. a spin coating method, an air doctor coating method, a blade coating method, a rod coating method a knife coating method and a squeeze coating method. Of these, the LB film method or the spin coating method is preferably used because of the good film properties. In these methods, spiropyrans or the like dyes are dissolved in inert solvents such as chloroform, aromatic hydrocarbons, e.g. benzene, toluene and the like, tetrahydrofuran, acetonitrile, acetone, ethanol and the like. Of course, a plurality of dyes may be dissolved in one solvent and applied into a substrate. Alternatively, a plurality of dyes may be separately dissolved in the respective solvents and applied onto a substrate one by one. The dyes are each dissolved in a solvent at a concentration of 0.1 to 50 wt% of the solution.

In the spin coating method, a 5 to 15 wt% dye solution is applied onto an optically transparent substrate, such as glass, quartz or synthetic resins including polystyrene, which is preferably surface treated with an alkylsilanes, such as trimethylchlorosilane, in order to render the surface hydrophobic, followed by spinning first at 50 to 600 r.p.m. for 10 to 100 seconds and then at 1000 to 2000 r.p.m. for 100 to 300 seconds for drying, thereby forming a dye layer.

The LB film method may be effected as follows: a solution of a dye in a suitable solvent is dropped over a water surface of an LB film-forming apparatus under conditions of water of a pH of 3 to 11 and a temperature of 10° to 30° C. Thereafter, the solution is compressed by means of a moving metal bar to such an extent of a surface pressure of 0 to 80 dynes/cm. This film is applied onto a surface-treated substrate. The above procedure is repeated to form a multilayer film on the substrate to a desired thickness of 0.0025 to 0.25 μm.

In these method, the dyes are preferably used in combination with an aid such as a semi-solid or solid alkane, in order to form a uniform dye layer or stabilize the layer. The alkane aid may be n-octadecane or n-hexadecane and is used at a molar ratio, to the dye, of 1:3 to 3:1.

The recording layer or layers are then subjected to UV irradiation to convert the dye or dyes into a corresponding photomerocyanines. Thereafter, the photomerocyanine layer is heated to a temperature of 30° to 45° C. for 0.1 to 20 minutes although these temperature and time conditions may vary depending on the type of dye. As a result, J-aggregates of the photomerocyanines are formed. As described before, the LB film method and the spin coating method are preferred for the formation of the J-aggregate. The reason for this is not clearly known, but it is considered that these methods are effective in orientation of dye molecules in the recording layer. This oriented state of dye molecules may be called "preaggregate". It will be noted that the heating should be effected to such an extent that the molecular structure of a dye does not undergo an irreversible change. In this sense, exact heating conditions should be determined on the respective dyes.

In the foregoing, photochromic spiropyran dyes have been described. Aside from the photochromic dyes, non-photochromic dyes which are able to form J-aggregates may also be used in the practice of the invention. Examples of the non-photochromic dyes include cyanines such as 1,1'-diethyl-2,2'-cyanine halides, 5,5',6,6'-tetrahalo-1,1',3,3'-tetraethylbenzoimidazocarbocyanine halides, 5,5'-dihalo-3,3',9-triethylthiacarbocyanine halides, 6,6'-dihalo-3,3'-diethylthiacarbocyanine halides and the like. These dyes form J-aggregates in the state of a solution with a suitable concentration. For instance, the cyanines are each dissolved in an inert solvent such as water at a concentration of from 0.01 to 0.2 moles per liter. To the solution is gradually added an aqueous solution of a salt such as potassium sulfate, sodium chloride, potassium nitrate, sodium acetate or the like while observing an absorption spectrum of the solution. When the width of the absorption spectrum is narrowest, the charge of the salt solution is stopped, followed by gelling with a gelling agent such as gelatin. A plurality of the thus obtained gels containing the respective cyanine dyes are spin coated as superposed and dried to obtain a recording layer. This type of recording layer may likewise be used in the practice of the invention.

If the recording layer is a single layer in which a plurality of dye aggregates are contained, the thickness is generally in the range of from 0.5 to 5 μm. On the other hand, when the respective dyes are formed into separate layers, each layer should preferably have a thickness of from 0.2 to 2 μm.

For ensuring good optical reading and writing operations, absorption spectra of different types of dye aggregates should preferably have a difference in half-value width of at least about 30 nm as indicated before.

The optically transparent substrates used in the present invention may take any forms of a disc, plate, sheet or the like and are generally made of glass, quartz, synthetic resins such as polystyrene, polyacrylates and the like.

The present invention is more particularly described by way of examples.

EXAMPLE 1

In this example, spiropyrans of the following chemical formulae (I) and (II) were used to make an optical recording medium by the LB film method.

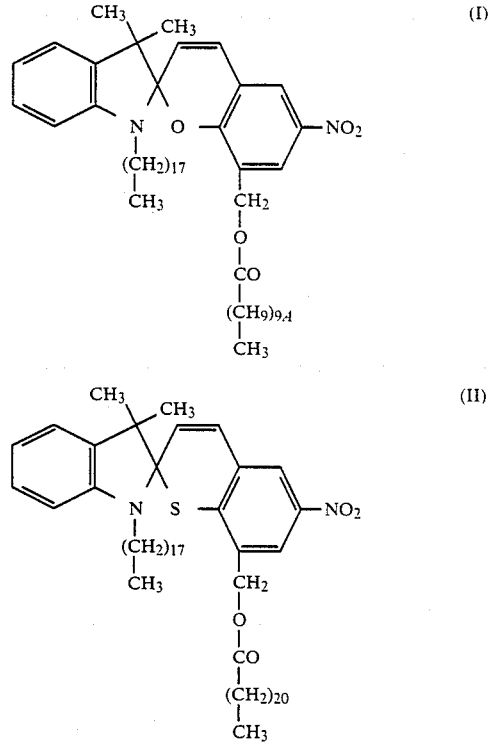

A Langmuir-type LB film-forming apparatus having a 1000 mm×500 mm trough was provided, in which a subphase of an aqueous phosphate buffer solution adjusted to a pH of 7.2 and a temperature of 18° C. was filled. One mmol/l of compound (I) and 2 mmol/l of n-octadecane were dissolved in chloroform. Seven hundreds microliters of the chloroform solution was developed over the surface of the subphase to form a monomolecular film. The film pressure was automatically controlled to be 20 mN/m. A glass disc having a diameter of 3.5 inches was provided as a substrate. The substrate was rendered hydrophobic on the surface thereof by immersion in a 10 vol% trimethylchlorosilane solution in toluene for 30 minutes. This substrate was vertically moved toward the monomolecular film of the compound (I) to form an LB film (20 layers of γ film) on the substrate as a layer.

The above procedure was repeated using compound (II) and n-octadecane, thereby forming another layer on the first-mentioned layer.

The thus fabricated double-layer recording medium is optically recorded and reproduced by an optical recording system as schematically shown in FIG. 1. In the figure, there is shown an optical recording medium 1 which has a glass substrate 11 and a recording layer 12 consisting of a sub-layer 13 of compound (I) and a sub-layer 14 of compound (II). Indicated by 2 is a lamp for erasure capable of emitting a UV ray of 350 nm and by 3 is an IR lamp for formation of aggregates of compounds (I) and (II). In front of the recording layer 12, there are provided laser devices 4, 5 capable of emitting two laser beams of 618 nm and 653 nm. These laser devices 4,5 are suitably arranged to give one optical axis and are able to emit the laser beams while carrying out tracking of the medium. The laser devices 4,5 are capable of changing output power from 500 mJ/cm$^2$ to 50 mJ/cm$^2$. Lasers used in the invention may be $CO_2$ laser, Xe laser, dye lasers or the like. Indicated by 6,7 are reading sensors having optical filters therein and capable of sensing light rays of 618 and 653 nm, respectively. The sensors 6,7 detect the intensities of beams from the laser devices 4, 5 passed through the optical recording medium 1.

Recording of the medium is described.

(a) Initialization

Figure 2:
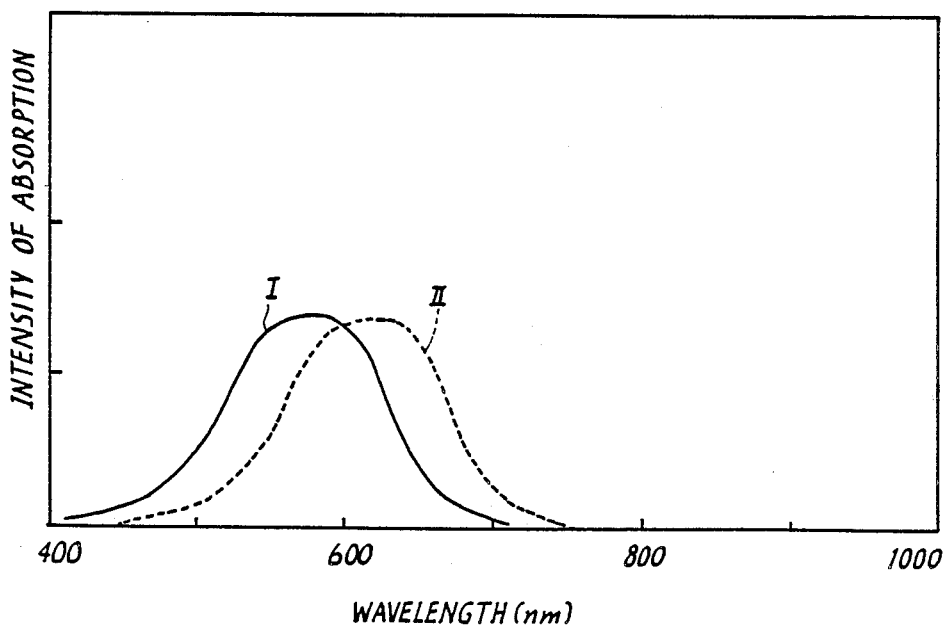
FIG. 2 is an absorption spectrum chart of a double-layer recording film of an optical recording medium obtained in Example 1 prior to formation of aggregates of the respective dyes in the layer.
Figure 3:
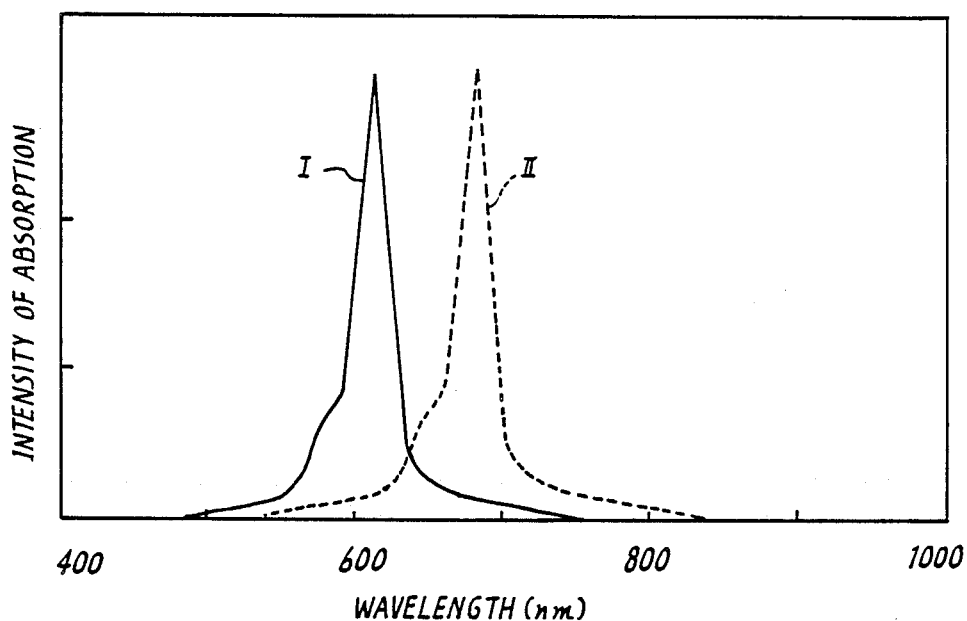
FIG. 3 is an absorption spectrum chart of the recording layer of FIG. 2 after formation of the aggregates of the respective dyes.

The recording layer obtained just after the fabrication is colorless. The medium 1 is exposed over the entire surface thereof with light from the erasure lamp 2, for example, for 10 minutes. As a result, colored photomerocyanines are formed in the respective sub-layers 13, 14. The absorption spectra of the sub-layers 13, 14 are shown in FIG. 2 as curves I and II, respectively. From the figure, it will be seen that the spectral curves are superposed in most parts. In this state, the IR ray from the lamp 3 is irradiated on the medium 1 and the recording layer 11 is maintained at a temperature of 35° to 40° C. for about 15 minutes, with the result that the photomerocyanines in the recording layer are converted into J-aggregates with different colors. The absorption spectra of the sub-layers 13, 14 after conversion into the J-aggregates are shown in FIG. 3 as curves I and II, respectively. As will be seen from the figure, the spectra are shifted to a longer wavelength side by about 35 to 50 nm with half-value widths as sharp as about 30 nm. From this fact, the formation of the J-aggregates is confirmed. By the above procedure, the optical recording medium is initialized.

(b) Writing

While tracking, the laser device is set at output power of 500 mJ/cm$^2$ and the medium is irradiated with a spot of the laser beam. By the irradiation, the sub-layer 13 alone is bleached on the spot and thus recorded. Moreover, when the optical recording medium 1 is irradiated with the laser device 5 alone at the same output level, the sub-layer 14 alone is bleached on a portion or spot where irradiated. In this manner, two bits can be independently written in one spot.

(c) Reading-out

While tracking in the same manner as in the writing (d) Erasure and Rewriting laser devices 4,5 set at 5.

The information of the written optical recording medium can be erased by repeating the initialization procedure (a). Information can be again written in the medium 1 by repetition of the procedure (b).

In the above procedure, the initialized state is determined as a colored state, and the color is bleached on writing, but the colorless state may be regarded as the initialized state and turned into a colored state by writing.

EXAMPLE 2

A solution of 5 wt% of compound (I) in toluene was spin coated at 500 r.p.m. on such a substrate as used in Example 1 to form the sub-layer 13. On the sub-layer 13 was further formed the sub-layer 14 by spin coating a solution of 5 wt% of compound (II) in toluene. The resultant optical recording medium could be used in the same manner as in Example 1, i.e. two bit signals per spot could be written, read, and erased.

EXAMPLE 3

A solution of each 5 wt% of compounds (I) and (II) in toluene was spin coated in the same manner as in Example 2 to form a recording layer on the substrate. The resultant optical recording medium could be used in the same manner as in Example 2, but the absorption spectra of the two types of J-aggregates produced on initialization were more widely superposed than these spectra in Examples 1 and 2. However, the absorption peaks were distinctly separated from each other.

EXAMPLE 4

Four dyes of the following formulas were used in this example.

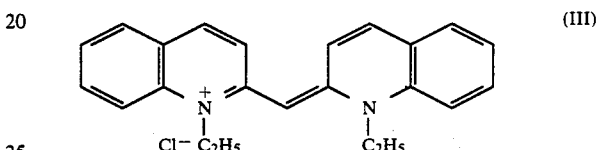

(III)

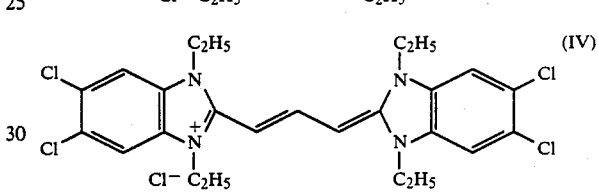

(IV)

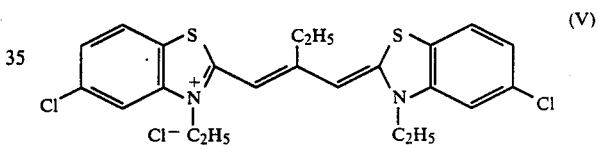

(V)

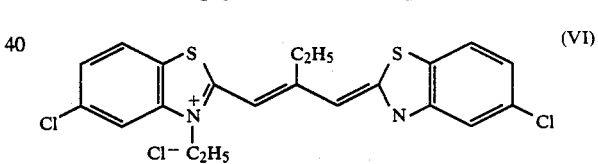

(VI)

These compounds were not photochromic in nature, but were able to form J-aggregates in the form of a solution. This was utilized to make a write-once optical recording medium.

Compounds (III) to (VI) were each dissolved in water to obtain a 0.02 mol/l aqueous solution. When an aqueous solution of 0.01 ml/l of potassium sulfate was gradually added to the solution of each compound, formation of a J-aggregate was confirmed through observation of the half-amplitude level of an absorption spectrum. When the half-amplitude level became narrowest for each solution, the addition of potassium sulfate was stopped. Thereafter, 10 wt% of gelatin, 4 wt% of ammonium dichromate, 0.1% of chrome alum and 0.01% of N-β-(aminoethyl)-γ-aminopropylmethyldimethoxysilane were added, as gelling agents, to each solution. Each solution was spin coated at 1000 r.p.m. onto a substrate as used in Example 1 to form an about 0.1 μm thick layer, followed by irradiation with a Xenon lamp to cure the layer. The above procedure was repeated to successively form the dye aggregate layers.

Figure 4:
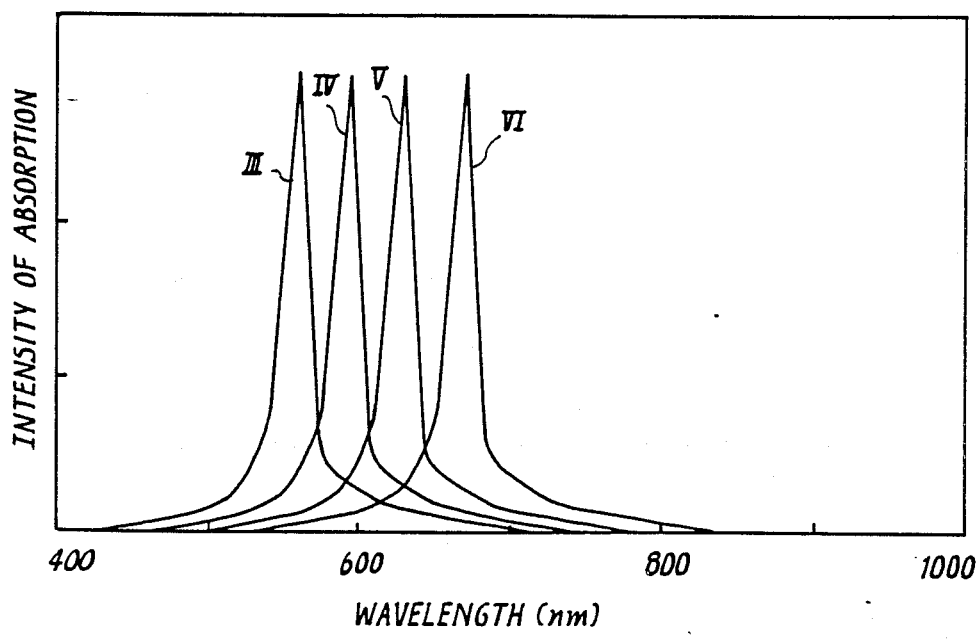
FIG. 4 is an absorption spectrum chart of a multilayer recording film of an optical recording medium obtained in Example 4.

The absorption spectra of the respective layers are shown in FIG. 4, revealing that the wavelengths at the absorption peaks were 570 nm for compound (III), 590 nm for compound (IV), 620 nm for compound (V) and 640 nm for compound (VI). All the layers had sharper half-amplitude levels by formation of J-aggregates and were optically distinguishable. Since these dyes had not photochromic properties, the medium could not be used for rewriting. However, when four laser devices capable of emitting beams of 570, 590, 620 and 640 nm and corresponding sensors were used, four bit signals could be written in one spot.

What is claimed is:

1. A method for recording optical information, comprising providing an optical recording medium having an optically transparent substrate and a layer formed on said substrate and comprising at least two photochromic dyes capable of forming corresponding aggregates having different absorption spectrum ranges optically distinguishable from each other, irradiating the layer with a UV ray to form photomerocyanines of the at least two dyes in the layer, heating the layer to a temperature sufficient to cause the respective photomerocyanines to form said corresponding aggregates, and subjecting the resultant medium to optical information recording by irradiation with a laser beam.

2. A method according to claim 1, wherein said aggregates are J-aggregates.

3. A method according to claim 1, wherein said at least two photochromic dyes are formed as separate sub-layers.

4. A method according to claim 1, wherein said photochromic dyes are spiropyran dyes.

5. A method according to claim 1, wherein the layer is heated to a temperature of 30° to 45° C. for 0.1 to 20 minutes to cause the respective photomerocyanines to form said corresponding aggregates.

6. A method according to claim 1, further comprising heating the recorded medium to erase the optical information.

* * * * *